(12) United States Patent
Maus et al.

(10) Patent No.: US 8,470,274 B2
(45) Date of Patent: Jun. 25, 2013

(54) METHOD FOR FEEDING REDUCING AGENT INTO AN EXHAUST GAS SYSTEM AND CORRESPONDING EXHAUST GAS SYSTEM AND MOTOR VEHICLE

(75) Inventors: Wolfgang Maus, Bergisch Gladbach (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 50 days.

(21) Appl. No.: 13/245,997

(22) Filed: Sep. 27, 2011

(65) Prior Publication Data
US 2012/0039779 A1 Feb. 16, 2012

Related U.S. Application Data

(63) Continuation of application No. PCT/EP2010/052314, filed on Feb. 24, 2010.

(30) Foreign Application Priority Data

Mar. 27, 2009 (DE) .......................... 10 2009 015 419

(51) Int. Cl.
*B01D 47/00* (2006.01)
*B01D 53/86* (2006.01)
*B01D 53/56* (2006.01)
*B01D 53/50* (2006.01)

(52) U.S. Cl.
USPC ........... 423/210; 423/235; 423/237; 423/238; 423/243.12

(58) Field of Classification Search
None
See application file for complete search history.

(56) References Cited

U.S. PATENT DOCUMENTS

| 5,826,428 | A | 10/1998 | Blaschke | |
|---|---|---|---|---|
| 6,203,770 | B1* | 3/2001 | Peter-Hoblyn et al. | 423/212 |
| 6,361,754 | B1* | 3/2002 | Peter-Hoblyn et al. | 423/213.2 |
| 7,581,386 | B2 | 9/2009 | Ranalli et al. | |
| 2006/0207243 | A1* | 9/2006 | Roberts et al. | 60/286 |
| 2009/0301064 | A1* | 12/2009 | Maier et al. | 60/286 |
| 2010/0024393 | A1* | 2/2010 | Chi et al. | 60/276 |
| 2010/0275701 | A1* | 11/2010 | Foss et al. | 73/861.12 |

FOREIGN PATENT DOCUMENTS

| DE | 19504183 A1 | 8/1996 |
|---|---|---|
| DE | 10256769 A1 | 8/2004 |
| EP | 1291498 A2 | 3/2003 |
| EP | 1331373 A2 | 7/2003 |
| JP | 2008215133 A | 9/2008 |

* cited by examiner

Primary Examiner — Melvin C Mayes
Assistant Examiner — Sheng H Davis
(74) Attorney, Agent, or Firm — Laurence A. Greenberg; Werner H. Stemer; Ralph E. Locher

(57) ABSTRACT

A method for feeding reducing agent or reducing agent precursor into exhaust systems of mobile internal combustion engines and an exhaust system are preferably used for internal combustion engines with high nitrogen oxide compound emissions. A feed time is established. An exhaust parameter and/or necessary quantity of reducing agent is determined and a feed state of the reducing agent is defined. The reducing agent is treated if the feed state does not correspond to a stored state. The reducing agent feed to the exhaust system takes place last. The steps are repeated multiple times. This permits reducing agent to be fed into an exhaust system in a state suitable for the exhaust temperature, so that complete conversion of reducing agent takes place and selectively catalytic reduction is also ensured. This reduces the quantity of electrical energy necessary for converting reducing agent. A motor vehicle having the system is also provided.

10 Claims, 1 Drawing Sheet

METHOD FOR FEEDING REDUCING AGENT INTO AN EXHAUST GAS SYSTEM AND CORRESPONDING EXHAUST GAS SYSTEM AND MOTOR VEHICLE

CROSS-REFERENCE TO RELATED APPLICATION

This is a continuation, under 35 U.S.C. §120, of copending International Application No. PCT/EP2010/052314, filed Feb. 24, 2010, which designated the United States; this application also claims the priority, under 35 U.S.C. §119, of German Patent Application DE 10 2009 015 419.1, filed Mar. 27, 2009; the prior applications are herewith incorporated by reference in their entirety.

BACKGROUND OF THE INVENTION

Field of the Invention

The invention relates to a method for the supply of reducing agent or reducing agent precursor into the exhaust system of a mobile internal combustion engine. The invention also relates to a corresponding exhaust gas system and a motor vehicle. Reducing agent supply methods and systems of that type are used preferably for exhaust systems of mobile internal combustion engines with high emissions of nitrogen oxide compounds.

The exhaust gases of internal combustion engines typically contain substances which are undesirable for emission into the environment. They include, in particular, carbon particles or also soot particles, carbon monoxide and/or nitrogen oxide compounds. In many countries, there are limit values for those substances, which define a maximum extent to which the substances may be contained in the exhaust gas of internal combustion engines. There are numerous methods for reducing the discharge of the stated types of emissions.

The ratio of the amounts of oxygen and fuel supplied to the internal combustion engine plays a significant role in determining the pollutant content of the exhaust gases of an internal combustion engine and in determining the methods suitable for exhaust-gas purification. It is advantageous for the lambda value to be 1 for the exhaust-gas purification. That means that the amounts of oxygen and fuel supplied to the internal combustion engine are such that exactly complete combustion of oxygen and fuel with one another is possible.

In recent times, internal combustion engines operated with a lambda value of greater than 1 have become ever more widely used. In those internal combustion engines, an excess of oxygen is present. Those internal combustion engines are distinguished, for example, by fuel consumption advantages. As a side effect, however, the emissions of nitrogen oxide compounds ($NO_x$) are increased significantly. In order to counteract that problem, the method of selective catalytic reduction was developed. In that case, the exhaust gas of the internal combustion engine has supplied to it, for example, ammonia and/or urea or a corresponding reducing agent which reacts with the nitrogen oxide compounds in the exhaust gas, so that the non-harmful products nitrogen, oxygen and water are produced.

Usually, ammonia is not supplied directly to the exhaust-gas flow. Ammonia is difficult to store. Urea or a urea-water solution are more suitable for being stored. It is preferable for a 32.5%, high-purity urea-water solution with the trade name AdBlue to be used. Ammonia is then generated from the urea through the use of thermolysis and/or hydrolysis. A minimum temperature of approximately 250° C. and, if appropriate, a hydrolytically acting surface past which the urea is conducted, are advantageous for that purpose.

The conversion of the urea into ammonia may take place either in the exhaust-gas flow or externally with respect to the exhaust gas. In the case of the exhaust-gas-internal conversion, the urea solution is supplied to the exhaust gas, for example in liquid, possibly finely atomized and/or gaseous form. The urea is subsequently converted in the exhaust-gas flow under the influence of the exhaust-gas temperature. In the case of the exhaust-gas-external conversion, the conversion takes place in a converter which is not traversed by the exhaust-gas flow. Heating of the converter takes place for that purpose. That is typically realized either by thermal conduction through the use of an exhaust-gas flow conducted past the outside of the converter, or through the use of external energy sources. Electric heaters which can quickly reach the temperature required for the conversion are particularly suitable in that case. With regard to the possibilities for the external conversion of reducing agent precursor into ammonia, reference is made, in particular, to International Publication No. WO 2007/131784 A1, corresponding to U.S. Patent Application Publication No. US 2009/0127511 A1.

In the conversion of the urea into ammonia, it is a problem that, in particular, the exhaust-gas temperatures of internal combustion engines operated with a lambda value of >1 and therefore with high emissions of nitrogen oxide compounds, are particularly low. The exhaust-gas temperatures are often not sufficient for the conversion of the urea into ammonia. In particular, in the case of motor vehicles which are operated in city traffic, or in the case of utility vehicles which are rarely operated at high load due to their usage, such as for example city buses, exhaust-gas temperatures sufficient for conversion arise extremely rarely. For that reason, the exhaust-gas-external conversion or the exhaust-gas-external evaporation of urea is of high significance. The large amount of electrical energy required for that purpose has an adverse effect on the efficiency of the internal combustion engine.

SUMMARY OF THE INVENTION

It is accordingly an object of the invention to provide a method for feeding reducing agent into an exhaust gas system and a corresponding exhaust gas system and a motor vehicle, which overcome the hereinafore-mentioned disadvantages and at least partially solve the highlighted problems of the heretofore-known methods, systems and vehicles of this general type. It is sought, in particular, to specify a method with which a conversion of reducing agent is ensured in different operating states of an exhaust system, wherein at the same time the energy required for that purpose should be reduced. Furthermore, it is sought to propose a system which likewise ensures the greatest possible conversion of the reducing agent precursor in the different operating states and which simultaneously makes do with little energy.

With the foregoing and other objects in view there is provided, in accordance with the invention, a method for feeding stored reducing agent into an exhaust system of an internal combustion engine. The method comprises the following steps:

a) establishing a feed time;
b) determining at least one exhaust-gas parameter or a reducing agent quantity;
c) defining a feed state of the reducing agent as a function of at least the exhaust-gas parameter or the reducing agent quantity and defining the feed state as a state of aggregation and/or a chemical composition;

d) treating the reducing agent if the feed state does not correspond to a stored state;

e) feeding the reducing agent in the feed state into the exhaust system; and repeating steps a) to e) multiple times.

Feed times may be established or fixed, for example with a defined frequency during the operation of the internal combustion engine. It is alternatively possible for feed times to be selected as a function of the rotational speed or cycle frequency of the internal combustion engine. A continuous feed of reducing agent is also possible within the context of the invention. A feed time should then be understood, in particular, to mean a feed time period, for which a certain feed state is defined, during the continuous feed of reducing agent. Steps a) to e) are then repeated multiple times in such a way that the individual feed time periods directly follow one another, so that continuous feeding takes place over the entire operating duration of the internal combustion engine.

The determination of an exhaust-gas parameter in step b) means, in particular, that an exhaust-gas parameter in and/or on the exhaust system is determined through the use of at least one sensor and/or at least one measurement probe. Additionally or alternatively thereto, it is also possible for the amount of reducing agent required in the exhaust system to be determined. This may take place while taking into consideration present measurement values, such as for example the nitrogen oxide quantity in the exhaust gas produced, and/or from empirical values, such as for example characteristic values, characteristic maps, etc. The amount of reducing agent is to be understood, in particular, to mean the (partial) amount which should be supplied (overall) to the exhaust system at a (single) point in time.

Reducing agent is also to be understood to mean at least a reducing agent precursor. Urea or a urea-water solution are used, in particular, as reducing agent. An approximately 32.5% urea-water solution is preferable in this case. It is possible for the reducing agent to be adapted in terms of its feed state, through the use of the method, in such a way that as complete as possible a conversion of the reducing agent into ammonia is ensured. A treatment of the reducing agent in step d) takes place typically when the temperature in the exhaust system is not sufficient for converting the reducing agent. The fact that the treatment in step d) is not carried out if the exhaust-gas parameter determined in step b) indicates that a treatment is not required for the complete conversion of the reducing agent, makes it possible to save energy, for example. This improves the efficiency of the internal combustion engine. Steps a) to e) are typically carried out anew for every feed of reducing agent into the exhaust system. An ideal adaptation of the feed state of the reducing agent is thereby ensured. It is, however, also possible for steps a) to d) to be carried out with a lower frequency than the actual feeding in step e). The method according to the invention can thus be implemented with lower expenditure. At the same time, however, the degree of adaptation of the feed state to the exhaust-gas parameters is also reduced.

A state of aggregation as a feed state of a reducing agent in step c) is to be understood, in particular, to mean whether the reducing agent is in solid, liquid or gaseous form. In general, either a liquid feed state or a gaseous feed state may be defined.

A chemical conversion as a feed state of a reducing agent in step c) is to be understood, in particular, to mean that the reducing agent is composed of certain molecular compounds in certain proportions. In general, the supplied reducing agent is composed partially of molecular compounds which have a reducing action, in particular ammonia, and partially of reducing agent precursor, in particular urea and/or urea-water solution. Different chemical compositions arise as a result of different proportions of compounds which have a reducing action and of reducing agent precursor.

The state of aggregation or the chemical composition of the reducing agent are changed through the use of the treatment in step d). The state of aggregation may, for example, be influenced by heating the reducing agent, in such a way that the reducing agent is evaporated and/or condensed. The chemical composition may arise, for example, as a result of an at least partial conversion of the molecular compounds of which the reducing agent is composed. In general, this means a conversion of reducing agent precursor, in particular urea and/or urea-water solution, into compounds which have a reducing action, in particular ammonia. It is also possible for a certain chemical composition of the reducing agent to be attained by mixing different reducing agent components during the treatment in step d).

In accordance with another mode of the invention, the method is particularly advantageous if, in step b), an exhaust-gas temperature is determined as an exhaust-gas parameter. The exhaust-gas temperature present in the exhaust system is an important parameter for the conversion of reducing agent in the exhaust system. A thermal conversion of reducing agent, that is to say a conversion into ammonia on the basis of the present temperature, typically takes place particularly effectively at exhaust-gas temperatures of higher than 250° C. It is, however, alternatively also possible for a different exhaust-gas parameter to be determined in step b). Possible exhaust-gas parameters in this case are, for example, an exhaust-gas pressure, a chemical parameter of the exhaust-gas flow such as, for example, a lambda value or an exhaust-gas volume flow. Combinations of different parameters are also possible. A temperature sensor integrated in the exhaust system is typically used to measure the exhaust-gas temperature.

In accordance with a further mode of the method of the invention, in step e), the reducing agent is supplied in gaseous form at low exhaust-gas temperatures and is supplied in liquid form at high exhaust-gas temperatures. The conversion of gaseous reducing agent takes place more easily than the conversion of liquid reducing agent even at relatively low exhaust-gas temperatures, because gaseous reducing agent need not initially be evaporated. In this case, it must be considered that the volume flow of supplied reducing agent itself lowers the exhaust-gas temperature. This may be prevented through the use of a gaseous supply. Furthermore, at low exhaust-gas temperatures, liquid reducing agent may accumulate on surfaces in the exhaust system. There, it can have a corrosive effect and thereby damage the exhaust system.

In accordance with an added mode of the method of the invention, in step d), an exhaust-gas-external evaporation of liquid reducing agent takes place if it was determined in step c) that the supply should take place in gaseous form. The exhaust-gas-external evaporation of the reducing agent allows the state of aggregation of the reducing agent to be changed without the exhaust-gas flow thereby being influenced. In particular, cooling of the exhaust-gas flow by the reducing agent does not occur. The liquid reducing agent may be conducted into a special evaporator volume for the exhaust-gas-external evaporation. It is particularly advantageous for the evaporator volume to be formed with a titanium coating, in particular with a titanium oxide surface. The titanium oxide surface itself contributes to the conversion (hydrolysis) of the urea into ammonia. A partial conversion therefore also already takes place at the same time as the evaporation of the reducing agent, in such a way that the temperature required in the exhaust system for the conversion may be lower. With regard to the exhaust-gas-external evaporation of the reducing agent, reference is also made herein in particular to International Publication No. WO 2007/131784 A1, corresponding to U.S. Patent Application Publication No. US 2009/0127511 A1, the entire contents of which is hereby incorporated by reference herein.

In a further advantageous embodiment of the method according to the invention, the evaporation of the liquid reducing agent takes place without the use of a hydrolysis catalytic converter.

In accordance with an additional mode of the method of the invention, it is particularly advantageous if the exhaust-gas-external evaporation of the reducing agent in step d) takes place through the use of electrical energy. The evaporation of the reducing agent through the use of electrical energy has the great advantage that it requires very short heating-up times. An evaporator operated with electrical energy requires only a very short time to reach a temperature at which the reducing agent evaporates virtually completely. It is advantageous, in particular, if even large adaptable amounts of power can be used for evaporation. In particular, at the start of operation of the internal combustion engine, not only is the temperature of the exhaust-gas flow low, but the evaporation device and the exhaust system are also at very low temperatures. Such low temperatures may be quickly compensated by the supply of large amounts of electrical energy. Typically, maximum levels of heating power of up to a maximum of 5000 Watts are advantageous.

In accordance with yet another mode of the method of the invention, it is also proposed that the reducing agent be supplied in gaseous form in the case of amounts up to a maximum of 10 ml, and in liquid form in the case of larger amounts.

An amount of reducing agent to be supplied may, in particular, also be taken into consideration during the establishment of the feed state of the reducing agent in step c). It is thus advantageous for an amount of up to a maximum of 10 ml [milliliters], preferably a maximum of 5 ml and particularly preferably a maximum of 2 ml, to be evaporated and supplied in gaseous form in step e), whereas larger amounts, in particular amounts greater than 20 ml [milliliters] or even greater than 30 ml, are always supplied in liquid form in step e).

In this variant embodiment, it is also possible for the determination of an exhaust-gas parameter in step b) to at least intermittently be omitted because no exhaust-gas parameter is required for defining the feed state as a function of the amount of reducing agent to be supplied.

Combined method implementations are also possible in which, below one of the stated maximum amounts of reducing agent, a gaseous supply of reducing agent always takes place and the execution of step b) is omitted if appropriate, whereas in the case of relatively large amounts, the method according to the invention is carried out with all of the method steps a) to e) and the feed state is defined as a function of an exhaust-gas parameter. It may likewise be provided that, in the case of amounts greater than a certain amount of reducing agent, a liquid supply of reducing agent always takes place, and below that amount of reducing agent, the method according to the invention is carried out with all of the method steps a) to e) and the feed state is defined as a function of an exhaust-gas parameter.

The background to this method variant is that, in the case of particularly small amounts of reducing agent, the amount of energy required for evaporation is not very large, and the introduction of energy into the reducing agent is effective, in such a way that with such amounts, the advantages of the gaseous supply of reducing agent can be realized without problems. In contrast, in the case of increased amounts of reducing agent, the energy expenditure for the evaporation is considerable. It may therefore be expedient in this case for reducing agent to always be supplied in liquid form. It must also be considered in this case that an exhaust system normally also has an increased demand for reducing agent specifically when increased temperatures prevail. A supply of liquid reducing agent can therefore often be realized in this case without problems. Likewise, specifically in the event of a low reducing agent demand, the temperatures in an exhaust system are often extremely low, such that generally only a reduced conversion can take place in the exhaust system. Therefore, a basically gaseous supply of reducing agent may be advantageous in this case.

The concept of defining the feed state of the reducing agent (only) on the basis of the amount may also be realized independently of the other contents of the disclosure of the application discussed herein.

With the foregoing and other objects in view there is provided, in accordance with the invention, an exhaust system, comprising at least one reducing agent tank, an exhaust line and at least one connecting line from the reducing agent tank to the exhaust line. The at least one connecting line forms at least one first flow path and at least one second flow path for reducing agent. Only the first flow path or the second flow path is formed with at least one of the following components:
a) a contact heater, or
b) a hydrolysis catalytic converter.

A flow path means a path along which the reducing agent passes through the at least one connecting line from the reducing agent tank to the exhaust line. The flow path may be predefined by the guidance of the reducing agent by the profile of the connecting line. In this case, the reducing agent flows along the connecting line. Alternatively, a flow path may be predefined in that the reducing agent, as a compact jet, passes through a cavity in the connecting line and, in this case, is conducted not by the profile of the connecting line but rather, for example, through the use of a nozzle.

An exhaust system of that type is suitable, in particular, for carrying out the method according to the invention. The reducing agent is conducted either along the first flow path or along the second flow path depending on which feed state for reducing agent has been defined. In this case, the devices for treating the reducing agent are constructed in such a way that they are used only if the reducing agent passes through the flow path provided for the treatment.

Contact heaters for the treatment of the reducing agent are distinguished in that they heat the reducing agent through contact with the contact heater. This may lead either merely to an evaporation of the reducing agent and/or already to an at least partial thermal conversion into ammonia. Hydrolysis catalytic converters are distinguished by a surface area which has a hydrolytic action as a result of the contact of the reducing agent with the hydrolysis catalytic converter, and therefore already lead to an at least partial conversion of the reducing agent even at relatively low temperatures. Contact heaters and hydrolysis catalytic converters may also be (partially) combined with one another.

In accordance with another feature of the invention, the exhaust system is advantageous, in particular, if a combination of contact heater and hydrolysis catalytic converter is provided, wherein an evaporator volume is provided which is preferably lined with a titanium layer and/or a titanium oxide layer and equipped with at least one electric heater. The advantages of a titanium and/or titanium oxide layer and of an electric heater have already been explained in the description of the method according to the invention. In addition to the titanium and/or titanium oxide layer, it is expedient for the evaporator volume to have a special wall construction which leads to a particularly advantageous temperature distribution in the evaporator volume. In this case, the innermost layer facing toward the evaporator volume may be the titanium and/or titanium oxide layer. Titanium typically has poor thermal conduction properties. For this reason, the titanium and/or titanium oxide layer is typically thin and a wall with good thermal conductivity is formed around the layer. A heating line or a heating layer which has an electrical resistance and which is thus suitable for electrically heating the evaporator volume through the use of a targeted application of electrical current, is optionally formed on the outside of the wall. In this case, too, reference is made to International Publication No. WO 2007/131784 A1, corresponding to U.S. Patent Application Publication No. US 2009/0127511 A1, the entire contents of which is incorporated herein by reference with regard to the configuration of the evaporator volume.

In accordance with a further feature of the invention, it is furthermore advantageous if at least one injection nozzle is constructed for the supply of reducing agent in liquid form into the exhaust system, wherein the injection nozzle is suitable for finely atomizing the reducing agent. If liquid reducing agent is supplied, the evaporation of the reducing agent must take place in the exhaust-gas flow. In this case, it is advantageous for the individual reducing agent droplets to be very small, which may be achieved through the use of a fine atomization. Small reducing agent droplets have a large surface area in relation to their volume, in such a way that a fast evaporation of the reducing agent can take place. The injection nozzle is preferably coupled only to the flow path which has no contact heater or hydrolysis catalytic converter.

In accordance with an added feature of the invention, it is furthermore advantageous if an adjustable flow deflector is provided in the at least one connecting line. The first flow path or the second flow path can be selectively activated through the use of the flow deflector. In this case, adjustability means that the activation of the first flow path or of the second flow path can take place through the use of a simple input signal to the flow deflector. The connecting line can typically be changed in terms of its geometry through the use of such a flow deflector. The adjustable flow deflector may, for example, be a controllable branch through the use of which a switch can be made between the first flow path and the second flow path. The flow deflector may alternatively be an adjustable nozzle through the use of which a flow path can be predefined in the form of a certain direction or in the form of a certain jet pattern.

With the objects of the invention in view, there is concomitantly provided a motor vehicle having an exhaust system set up for carrying out the method according to the invention or having an exhaust system according to the invention. In a motor vehicle of this type, the method according to the invention may, for example, be integrated into the controller of the exhaust system and/or the engine controller.

Other features which are considered as characteristic for the invention are set forth in the appended claims, noting that the features specified individually in the dependent claims can be combined with one another in any desired technologically meaningful way and present further embodiments of the invention.

Although the invention is illustrated and described herein as embodied in a method for feeding reducing agent into an exhaust gas system and a corresponding exhaust gas system and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
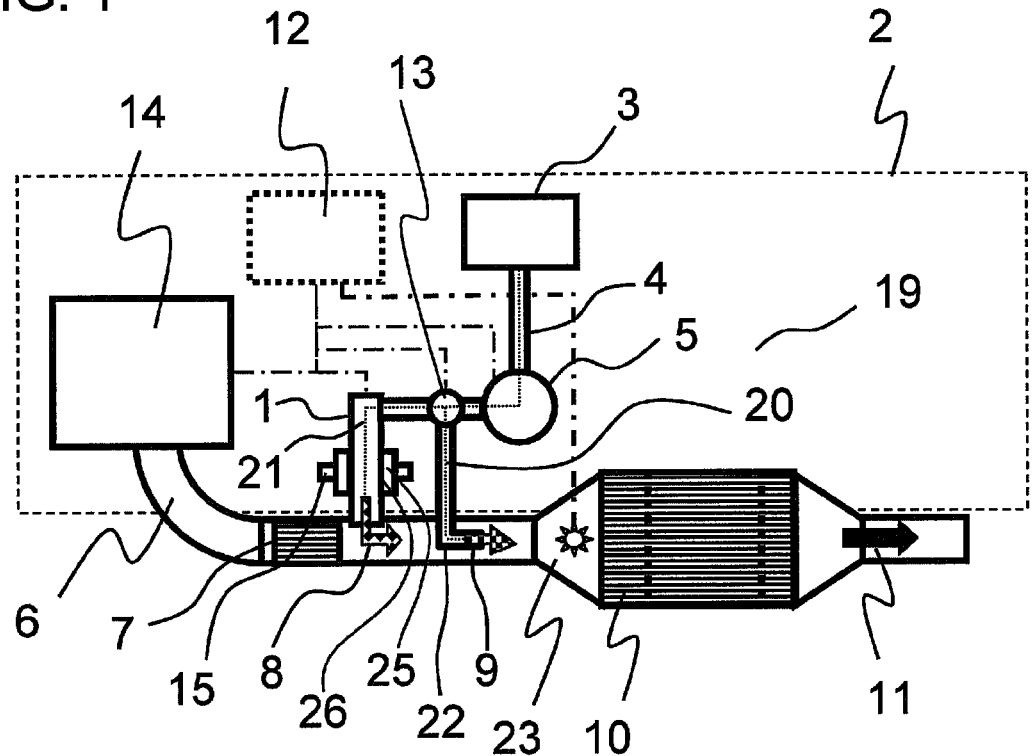
FIG. 1 is a diagrammatic, plan view of a motor vehicle having an exhaust system according to the invention.

Referring now in detail to the figures of the drawing for explaining the invention and the technical field in more detail by showing particularly preferred structural variants to which the invention is not restricted, and first, particularly, to FIG. 1 thereof, there is seen a motor vehicle 2 which has an internal combustion engine 14 with an exhaust system 19 according to the invention. The exhaust system 19 includes an exhaust line 6 which extends away from the internal combustion engine 14. An exhaust-gas flow 11 flows away from the internal combustion engine 14 through the exhaust line 6. In this case, the exhaust-gas flow 11 along the exhaust line 6 firstly passes through a catalytic converter 7. The catalytic converter 7 is already provided for the conversion of pollutants in the exhaust-gas flow 11. The exhaust-gas flow 11 subsequently passes a first supply 8 for gaseous reducing agent and then a second supply 9 for liquid reducing agent. The second supply 9 is provided with an injection nozzle 22 which can finely atomize the liquid reducing agent. The sequence may, however, also be modified. A sensor 23 through which an exhaust-gas parameter is monitored, is provided downstream along the exhaust line 6. An SCR catalytic converter 10 in which the nitrogen oxide compounds contained in the exhaust gas are converted with the reducing agent, is provided downstream of the sensor 23. A reducing agent tank 3 is provided for the supply of reducing agent into the exhaust system 19. There is also a connecting line 4 which connects the reducing agent tank 3 to the exhaust line 6. A pump 5 for conveying the reducing agent is provided in the connecting line 4. An adjustable flow deflector 13, which is also provided in the connecting line 4, is formed in this case as an adjustable branch through which a first flow path 20 or a second flow path 21 to be followed by the reducing agent from the reducing agent tank 3 to the exhaust line 6 can be set as required and dosed, if appropriate. A combined contact heater with a hydrolysis catalytic converter 26 which has an evaporator volume 1, is formed only along the second flow path 21. The evaporator volume 1 can be heated through the use of an electric heater 15, as a result of which a treatment of the reducing agent can take place. A controller 12 is additionally provided to coordinate the operation of the pump 5, the adjustable flow deflector 13, the electric heater 15 and the internal combustion engine 14, taking into consideration the exhaust-gas parameter determined through the use of the sensor 23.

During the execution of the method according to the invention in an exhaust system 19 according to FIG. 1, after a feed time is established by the controller 12, an exhaust-gas parameter is determined through the use of the sensor 23. A certain feed state of the reducing agent is subsequently defined in the controller 12. The adjustable flow deflector 13 in the connecting line 4 is set in such a way that the reducing agent must follow the flow path (first flow path 20 or second flow path 21) corresponding to the defined feed state. Furthermore, it is checked whether or not the state of the reducing agent in the reducing agent tank 3 corresponds to the defined feed state of the reducing agent. If the defined feed state differs from the state of the reducing agent in the reducing agent tank 3, the reducing agent is treated through the use of a contact heater 25, and/or through the use of the hydrolysis catalytic converter 26 and the electric heater 15, in such a way that the feed state corresponds to the defined feed state. The feeding of the reducing agent takes place through the use of the first supply 8 or through the use of the second supply 9, depending on which feed state has been defined by the controller 12. The engine controller 12 ensures a multiple and, in particular, regular repetition of the individual steps of the feed method during the operation of the internal combustion engine 14.

Figure 2:
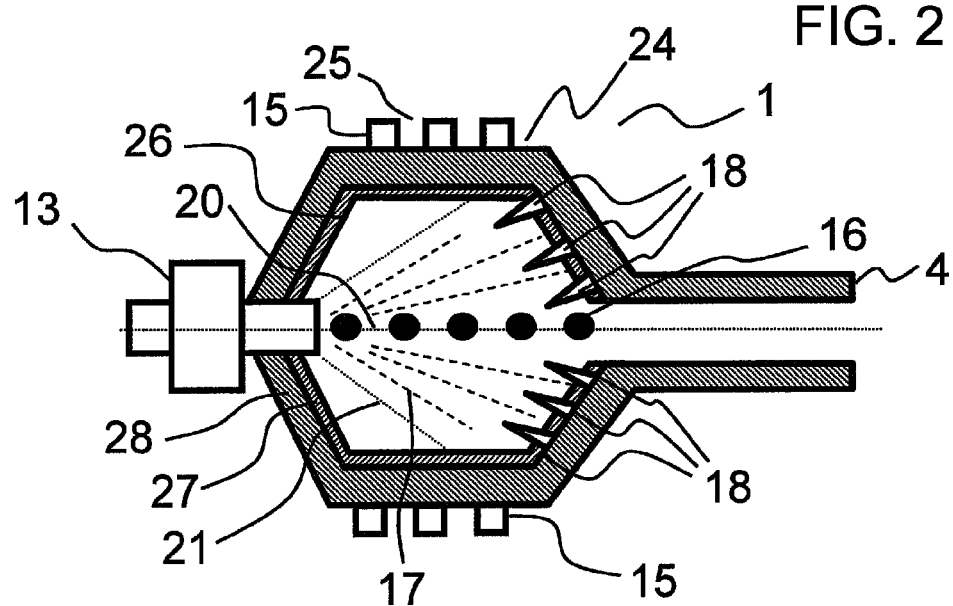
FIG. 2 is a cross-sectional view of an evaporator volume for a further exhaust system according to the invention.

FIG. 2 shows an embodiment of the connecting line 4, the adjustable flow deflector 13 and the evaporator volume 1, with this embodiment being suitable for a further embodiment of the exhaust system according to the invention. In this case, the adjustable flow deflector 13 is constructed as an adjustable jet-forming device and is provided in the connecting line 4. Through the use of the adjustable jet-forming device, it is possible for the reducing agent to be conveyed either along a first flow path 20 as a compact jet 16 or along a different, second flow path 21 as a spray jet 17, in such a way that different jet profiles and/or impingement points or impingement areas of the jet are provided. In this case, both the first flow path 20 as well as the second flow path 21 pass through the evaporator volume 1. In this case, the first flow path 20 is compact, whereas the second flow path 21 is fanned out. The compact jet 16 along the first flow path 20 passes through the evaporator volume 1 without evaporating. This is, in particular, because it passes through the evaporator volume 1 on the shortest path without coming into contact with a wall 24 or the contact heater 25, and absorbs practically no thermal energy in the evaporator volume 1. The spray jet 17 fans out and disperses in the evaporator volume 1 and impinges on the walls 24 or on the contact heater 25. If appropriate, the walls 24 of the evaporator volume 1 have special structures 18 which lead to an accumulation of or to contact of the individual droplets of the spray jet 17 and which thereby ensure a residence time of the reducing agent in the evaporator volume 1, during which residence time the reducing agent evaporates. The wall 24 of the evaporator volume 1 may, as has already been stated, be formed with an inner titanium layer 27 and a special heat-conducting layer 28, corresponding to International Publication No. WO 2007/131784 A1, corresponding to U.S. Patent Application Publication No. US 2009/0127511 A1. The titanium layer 27 may thus also act as a hydrolysis catalytic converter 26. At the same time, the heat-conducting layer 28 ensures a uniform distribution of the temperature in the evaporator volume 1. An electric heater 15 is situated at the outside around the evaporator volume 1 so that the evaporator volume 1 can be brought to the temperature required for the evaporation through the use thereof.

The method according to the invention and the exhaust system according to the invention permit a supply of reducing agent into an exhaust system in the state suitable for the exhaust-gas temperature in each case, in such a way that as complete as possible a conversion of the reducing agent takes place. Furthermore, the method according to the invention and the exhaust system according to the invention reduce the amount of energy required for the conversion of reducing agent.

The invention claimed is:

1. A method for feeding stored reducing agent into an exhaust system of an internal combustion engine, the method comprising the following steps:
 a) establishing a feed time;
 b) determining a reducing agent quantity;
 c) defining a feed state of the reducing agent as a function of the reducing agent quantity and defining the feed state as at least a state of aggregation for supplying the reducing agent in gaseous form for amounts of the reducing agent quantity up to a given threshold and for supplying the reducing agent in liquid form for amounts of the reducing agent quantity larger than the given threshold;
 d) treating the reducing agent if the feed state does not correspond to a stored state;
 e) feeding the reducing agent in the feed state into the exhaust system; and
 repeating steps a) to e) multiple times.

2. The method according to claim 1, which further comprises carrying out an exhaust-gas-external evaporation of liquid reducing agent in step d) if it was determined in step c) that the supply should take place in gaseous form.

3. The method according to claim 2, which further comprises carrying out the exhaust-gas-external evaporation of liquid reducing agent using electrical energy.

4. The method according to claim 1, wherein the given threshold is 10 ml.

5. A motor vehicle, comprising:
 an exhaust system set up for carrying out the method according to claim 1.

6. The method according to claim 1, which further comprises:
 in step c, defining the feed state as a chemical composition.

7. The method according to claim 1, which further comprises:
 in step b, determining at least one exhaust gas parameter;
 in step c, defining a feed state of the reducing agent as a function of the exhaust gas parameter.

8. The method according to claim 7, which further comprises determining an exhaust-gas temperature as an exhaust-gas parameter in step b).

9. The method according to claim 8, which further comprises supplying the reducing agent in gaseous form at low exhaust-gas temperatures and supplying the reducing agent in liquid form at high exhaust-gas temperatures, in step e).

10. The method according to claim 8, which further comprises:
 supplying the reducing agent in liquid form when the threshold value is exceeded;
 or
 supplying the reducing agent in gaseous form when the temperature is below a given value.

* * * * *